(12) United States Patent
Hong

(10) Patent No.: US 12,432,541 B2
(45) Date of Patent: Sep. 30, 2025

(54) INFORMATION TRANSMISSION METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 431 days.

(21) Appl. No.: 18/013,823

(22) PCT Filed: Jul. 2, 2020

(86) PCT No.: PCT/CN2020/099905
§ 371 (c)(1),
(2) Date: Dec. 29, 2022

(87) PCT Pub. No.: WO2022/000411
PCT Pub. Date: Jan. 6, 2022

(65) Prior Publication Data
US 2023/0328497 A1    Oct. 12, 2023

(51) Int. Cl.
*H04W 4/00* (2018.01)
*H04W 4/14* (2009.01)
*H04W 4/90* (2018.01)
*H04W 72/23* (2023.01)

(52) U.S. Cl.
CPC .............. *H04W 4/90* (2018.02); *H04W 4/14* (2013.01); *H04W 72/23* (2023.01)

(58) Field of Classification Search
CPC ......... H04W 4/90; H04W 4/14; H04W 72/23; H04W 76/50
See application file for complete search history.

(56) References Cited

U.S. PATENT DOCUMENTS

| 2019/0320455 | A1 | 10/2019 | Chen et al. | |
| 2019/0349902 | A1* | 11/2019 | Soriaga | H04W 72/23 |
| 2020/0137669 | A1 | 4/2020 | Lee et al. | |
| 2021/0152982 | A1* | 5/2021 | Agarwal | H04W 4/90 |

FOREIGN PATENT DOCUMENTS

| CN | 106559809 A | 4/2017 |
| CN | 110351831 | 10/2019 |
| CN | 111096009 A | 5/2020 |

OTHER PUBLICATIONS

PCT/CN2020/099905, English translation of International Search Report dated Apr. 1, 2021, 2 pages.

* cited by examiner

*Primary Examiner* — Omoniyi Obayanju
(74) *Attorney, Agent, or Firm* — Cozen O'Connor

(57) ABSTRACT

A wireless communication network transmits disaster warning information using downlink control information. An information transmission method includes: delivering downlink control information (DCI) carrying disaster warning information, in which the disaster warning information is carried in an SMS indication in the DCI, and indicates that a disaster has occurred or predicts that a disaster is to occur. One or more reserved bits of the short message of the downlink control information may be used to carry the disaster warning information.

17 Claims, 4 Drawing Sheets

INFORMATION TRANSMISSION METHOD AND APPARATUS, COMMUNICATION DEVICE, AND STORAGE MEDIUM

CROSS-REFERENCE TO RELATED APPLICATION

This application is a Section 371 National Stage Application of International Application No. PCT/CN2020/099905, filed on Jul. 2, 2020, the entire content of which is incorporated herein by reference for all purposes.

TECHNICAL FIELD

The present disclosure relates to the field of wireless communication, and more particularly to an information transmission method and apparatus, a communication device, and a storage medium.

BACKGROUND

Warnings of destructive earthquakes and other disasters can be realized through user equipment terminals and Internet of Things platforms. Disaster warning relies on earthquake monitoring sensor networks to dynamically identify earthquakes, analyze data, and send warning information to smart terminals such as mobile phones and televisions in affected areas at the fastest speed. Smart terminals of the Internet of Things such as mobile phones and televisions that have received warning information adopt the most advanced push strategy, which may immediately and accurately tell a user how many seconds after the earthquake wave arrives and how much damage it may cause based on the user's location, and at the same time prompt safe havens, emergency contacts and the owner's medical information card to help patients receive assistance as soon as possible.

SUMMARY

According to a first aspect of the present disclosure, an information transmission method is provided. The information transmission method is applied to a base station. The information transmission method includes: delivering downlink control information (DCI) carrying disaster warning information, in which the disaster warning information is carried in a short message indicator in the DCI or carried in a short message; and the disaster warning information indicates that a disaster has occurred or predicts that a disaster is to occur.

According to a second aspect of the embodiments of the present disclosure, an information transmission method is provided. The information transmission method is applied to user equipment (UE). The information transmission method includes: receiving DCI carrying disaster warning information, in which the disaster warning information is carried in a short message indicator in the DCI or carried in a short message, and the disaster warning information indicates that a disaster has occurred or predicts that a disaster is to occur.

According to a third aspect of embodiments of the present disclosure, a communication device is provided. The communication device includes a processor, a transceiver, a memory, and an executable program stored in the memory and capable of being executed by the processor. The processor implements an information transmission method when executing the executable program. The information transmission method is applied to user equipment (UE). The information transmission method includes: receiving DCI carrying disaster warning information, in which the disaster warning information is carried in a short message indicator in the DCI or carried in a short message, and the disaster warning information indicates that a disaster has occurred or predicts that a disaster is to occur.

BRIEF DESCRIPTION OF DRAWINGS

The accompanying drawings, which are incorporated into and constitute a part of this specification, illustrate embodiments consistent with the present disclosure and, together with the specification, serve to explain the principles of the present disclosure rather than limit the present disclosure improperly.

DETAILED DESCRIPTION

Embodiments will be described in detail, with examples thereof illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of devices and methods consistent with some aspects of the present disclosure.

Terms used in the present disclosure are only for the purpose of describing specific embodiments and are not intended to limit the present disclosure. As used in the description of the present disclosure and the appended claims, "a" "said" and "the" in singular forms mean including plural forms, unless clearly indicated in the context otherwise. It should also be understood that, as used herein, the term "and/or" represents and contains any one and all possible combinations of one or more associated listed items.

It should be understood that although terms such as "first," "second" and "third" may be used in embodiments of the present disclosure to describe various pieces of information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the term "if" may be construed to mean "when" or "upon" or "in response to determining".

Figure 1:
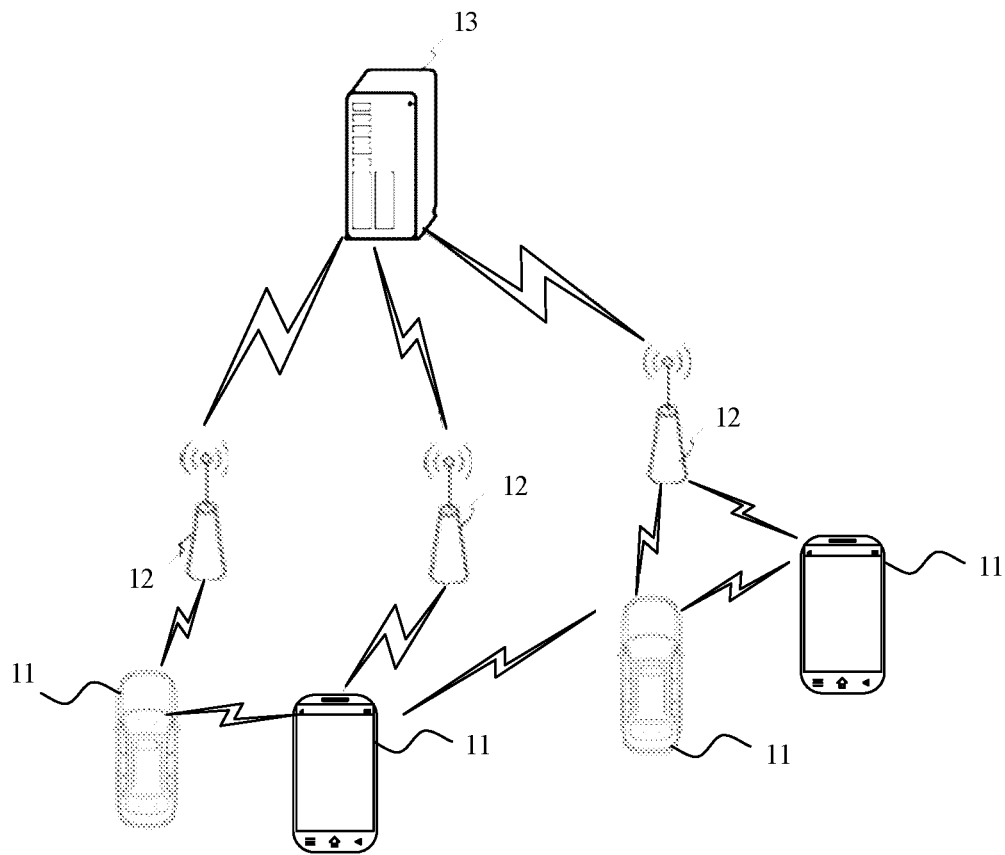
FIG. 1 is a schematic view of a wireless communication system according to an embodiment.

Referring to FIG. 1, a schematic view of a wireless communication system according to an embodiment of the present disclosure is illustrated. As shown in FIG. 1, the wireless communication system is a communication system based on cellular mobile communication technology, and the wireless communication system may include several terminals 11 and several base stations 12.

The terminal 11 may be a device that provides voice and/or data connectivity to users. The terminal 11 may communicate with one or more core networks via a Radio Access Network (RAN). The terminal 11 may be an IoT terminal such as a sensor device, a mobile phone (or "cellular" phone) and a computer having an IoT terminal, and for example, may be a fixed, portable, pocket, handheld, computer built-in or vehicle-mounted device. For example, a station (STA), a subscriber unit, a subscriber station, a mobile station, a mobile station, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be a vehicle-mounted device, for example, a trip computer with wireless communication functions, or a wireless communication device coupled to an external trip computer. Alternatively, the terminal 11 may also be a roadside device, for example, a street lamp, a signal lamp, or other roadside devices with wireless communication functions.

The base station 12 may be a network-side device in a wireless communication system. The wireless communication system may be a 4th generation (4G) mobile communication system, also known as a Long Term Evolution (LTE) system. Alternatively, the wireless communication system may also be a 5G system, also known as a new radio (NR) system or a 5G NR system. Alternatively, the wireless communication system may also be a next-generation system of the 5G system. The access network in the 5G system may be called NG-RAN (New Generation-Radio Access Network). Alternatively, the wireless communication system may be MTC system.

The base station 12 may be an evolved base station (eNB) used in the 4G system. Alternatively, the base station 12 may also be a base station (gNB) that adopts a centralized distributed architecture in a 5G system. When the base station 12 adopts a centralized distributed architecture, it usually includes a central unit (CU) and at least two distributed units (DU). The central unit includes a protocol stack of a packet data convergence protocol (PDCP) layer, a radio link layer control protocol (RLC) layer, and a media access control (MAC) layer. The distributed unit includes a protocol stack of physical (PHY) layers. The specific implementation manner of the base station 12 is not limited in the embodiments of the present disclosure.

A wireless connection can be established between the base station 12 and the terminal 11 through a wireless air interface. In different embodiments, the wireless air interface is a wireless air interface based on the fourth generation mobile communication network technology (4G) standard; alternatively, the wireless air interface is a wireless air interface based on the fifth generation (5G) mobile communication network technology standard, and for example, the wireless air interface is a new air interface; alternatively, the wireless air interface may also be a wireless air interface based on a next generation of 5G mobile communication network technology standard.

In some embodiments, an E2E (end to end) connection may also be established between the terminals 11, such as V2V (vehicle to vehicle) communication, V2I (vehicle to infrastructure) communication, and V2P (vehicle to pedestrian) communication in V2X (vehicle to everything) communication.

In some embodiments, the above wireless communication system may further include a network management device 13.

Several base stations 12 are respectively coupled to the network management device 13. The network management device 13 may be a core network device in the wireless communication system. For example, the network management device 13 may be a mobility management entity (MME) in an evolved packet core network (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in the embodiments of the present disclosure.

The execution subjects involved in the embodiments of the present disclosure include but are not limited to UEs such as terminals supporting cellular mobile communication, and base stations.

The application scenarios of the embodiments of the present disclosure include that the earthquake and tsunami warning system (ETWS) and the commercial mobile alert system (CMAS) carry warning indications through paging messages. The base station carries warning indications in the paging messages, and carries specific ETWS information in SIB10 and SIB11 and specific CMAS information in SIB12.

When the base station sends the warning information, the UE needs to monitor the PDCCH signaling for scheduling the paging message in the PDCCH, determine the DCI for scheduling the paging message in the PDCCH signaling, and use the transmission resources indicated by the DCI to receive the paging message. After confirming that there is an alert indication in the paging message, the UE needs to read the SIB1 to find the receiving resources of SIB10, SIB11, or SIB12 that carry the warning information, receive SIB10, SIB11 or SIB12 on the receiving resources, and parse the warning information. The entire receiving process causes a large delay, which is inconsistent with the expected timeliness of disaster warning.

Figure 2:
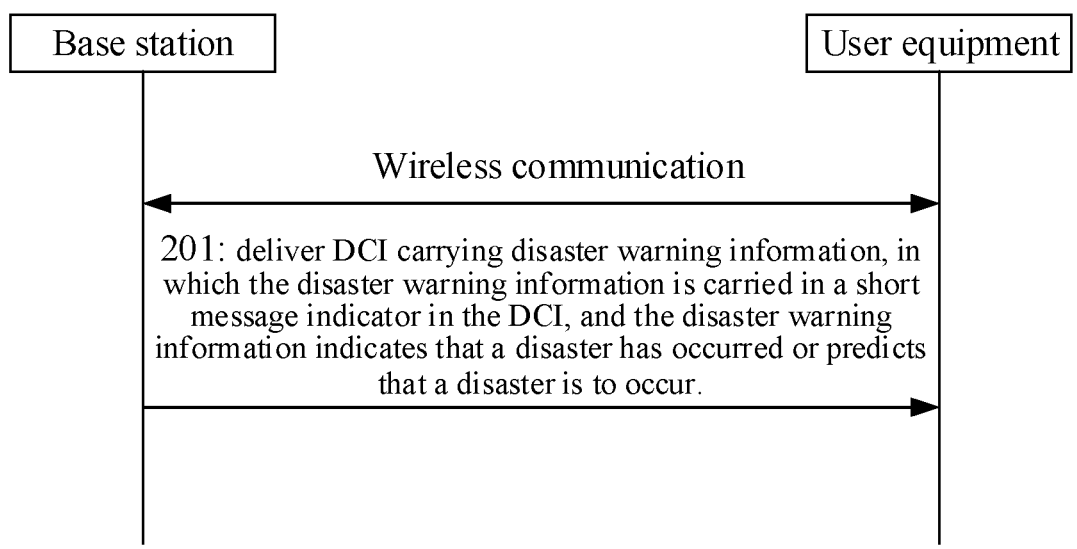
FIG. 2 is a flowchart of an information transmission method according to an embodiment.

Embodiments of the present disclosure provide an information transmission method that can be applied to a base station in a mobile communication network. As shown in FIG. 2, the information transmission method may include: in step 201, delivering DCI carrying disaster warning information, in which the disaster warning information is carried in a short message indicator in the DCI, and the disaster warning information indicates that a disaster has occurred or predicts that a disaster is to occur.

Here, the disaster warning information may be used to indicate the occurrence of disaster events to the UE, and the disaster events may include: earthquake, tsunami, and human-made disaster events as defined in ETWS and/or CMAS. The disaster warning information can be defined to indicate one or more disaster events, and the disaster warning information can also be defined to generally refer to all disaster events.

The disaster warning information may use one bit or a plurality of bits to indicate a disaster event.

In some examples, a warning event occupies one bit, and "0" can be used to indicate that no disaster event has occurred, and "1" can be used to indicate that a disaster event has occurred. It is also possible to use "1" to indicate that no disaster event has occurred, and "0" to indicate that a disaster event has occurred. The warning event may also occupy a plurality of bits, and a plurality of codes with different bits are used to represent different disaster events. For example, "01" can be used to indicate the occurrence of a disaster event, and "10" can also be used to indicate the occurrence of a disaster event.

In downlink communication, the base station first uses PDCCH resources to send DCI for scheduling transmission resources. The base station can use DCI to carry disaster warning information. The base station can use reserved bits in the DCI to carry the disaster warning information, or can use the reserved bits to encode the disaster warning information. Here, for example, the DCI may be the DCI format 1_0 for downlink scheduling.

In some examples, one code of two bits is used in DCI to carry specific information, and other codes of the two bits are not defined. For example, "00" is used to carry the specific information, and "01", "10" and "11" are not defined. At this time, one or more of "01", "10" and "11" may be defined as disaster warning information.

During the data communication process, the UE can monitor the PDCCH resources. When the base station has the information to be sent to the UE, the PDCCH signaling can be sent in the PDCCH resource. The PDCCH signaling carries the DCI to indicate the PDSCH resource that carries the data information.

The DCI may carry a short message indicator, and the short message indicator is used to indicate the configuration of the paging message and the short message carried by the DCI. Here, the short message indicator can be used to carry disaster warning information. After receiving the DCI, the UE can obtain the short message indicator by parsing the DCI content, and then determine the warning information in the short message indicator.

When the UE monitors the downlink communication of the base station, it firstly monitors the downlink DCI using PDCCH resources. Therefore, when the DCI carries disaster warning information, the UE can obtain the disaster warning information after parsing the DCI. After receiving the disaster warning information, the UE may alert the user by means of prompts such as images and/or sounds and/or vibrations. Here, the UE may be in a connected state, an idle state or an inactive state.

In this way, the base station uses the DCI to carry the disaster warning information, and the UE can directly obtain the disaster warning information from the DCI, which shortens the receiving process of obtaining the disaster warning information, reduces the receiving time, and improves the timeliness of the warning.

In an embodiment, the DCI further carries resource scheduling information for scheduling transmission resources.

Here, DCI can be used to schedule transmission resources. The transmission resources may include downlink transmission resources and the like. The UE may determine the transmission resource for data transmission according to the indication of the resource scheduling information. Disaster warning information can be carried by using the DCI that schedules the transmission resources. The amount of information carried by the DCI is increased, and the utilization efficiency of the DCI is improved.

In an embodiment, the transmission resources scheduled by the resource scheduling information are used to transmit paging messages.

When the UE is in an idle state or an inactive state, the UE monitors the DCI on the PDCCH resource for scheduling the transmission resource of the paging message.

The base station can carry disaster warning information in the DCI, and the UE can analyze the disaster warning information in the DCI at the first time when monitoring the PDCCH resources. Compared with determining the warning indication from the paging message and obtaining the disaster warning information from the SIB, the receiving process of the disaster warning information is shortened, the receiving time is reduced, and the timeliness of the warning is improved.

In an embodiment, the DCI is scrambled with a cyclic redundancy check (CRC) using a paging radio network temporary identifier P-RNTI.

Here, the DCI for carrying the disaster warning information may be the DCI for scheduling the transmission resources of the paging message, and the DCI may be the DCI format 1_0 of CRC scrambled by P-PNTI.

In an embodiment, a reserved code of the short message indicator of the DCI carries the disaster warning information.

The short message indicator is set in the DCI of the P-PNTI scrambling CRC. The short message indicator occupies two bits, and the short message indicator adopts different coding indications, paging messages and configurations of short messages carried by the DCI.

In some examples, as shown in Table 1, the short message indicator occupies two bits, and adopts different codes to indicate different contents. Here, "00" can be used to carry disaster warning information. When the UE parses that the short message indicator is "00", the disaster warning information is determined. Here "00" may indicate that a disaster event has occurred.

TABLE 1

| Code | Content indicated |
| --- | --- |
| 00 | reserved |
| 01 | only scheduling information of the paging message is configured in the DCI |
| 10 | only short messages are configured in DCI |
| 11 | only scheduling information of the paging message and short messages are configured in the DCI |

The UE can send warning information through an application layer, and the UE can send warnings by means of sound, image or vibration.

When the base station sends the disaster warning information, it can give priority to the disaster warning information in the short message indicator. That is, when the base station sends the disaster warning information, the code "00" is preferentially used for the short message indicator.

In an embodiment, the short message of the DCI may carry disaster prediction information associated with the disaster warning information, and the disaster prediction information indicates at least one of the following items: a type of a predicted disaster; a level of the predicted disaster; a geographic location of the predicted disaster; and time of the predicted disaster.

The DCI may also carry a short message, and the short message may be used to carry the disaster prediction information.

The disaster warning information can be used directly to indicate that a disaster has occurred or predict a disaster. The disaster prediction information can provide detailed information on the predicted disaster.

In some examples, the short message occupies eight bits, in which the first bit to the third bit are used to indicate a change of the communication system information, and indicate the stop of monitoring the paging message.

Here, one or more of the fourth bit to the eighth bit may be used to indicate the disaster prediction information.

In some examples, the indication information of the disaster type may occupy one or two bits, and different codes are used to indicate different disaster types, such as earthquake, tsunami and so on.

In some examples, when the base station sends disaster warning information, a short message indicator may be used to indicate a disaster warning prompt. Disaster is indicated with the reserved code "00", but the type of disaster is not indicated. When the base station sends the disaster warning information, the short message can also be used to indicate the disaster prediction information. The disaster prediction information is indicated by a plurality of bits reserved in the short message, and the type and level of the disaster are indicated by different codes.

The disaster prediction information may also indicate a predicted occurrence time and/or a predicted geographic range of a disaster.

In some examples, the prediction information may also include detailed information such as the severity of the disaster. For example, the prediction information may include: typhoon level, earthquake level, and focal depth.

In some examples, when the base station sends disaster warning information, a short message may also be used to indicate a disaster warning prompt. The disaster is indicated by reserved two bits, and the type of disaster is indicated by different codes. The remaining multiple bits can also be used to indicate the predicted occurrence time and/or predicted geographic range of the disaster. In this way, more detailed disaster information can be provided.

In some examples, the disaster warning information may also include warning protection information, which is used to instruct the user how to protect, how to seek help, and the like. For example, for typhoons, disaster warning information can provide tips on how to protect, for example, reducing going out and closing doors and windows, and can provide directions on locations of nearby shelters or hospitals.

Figure 3:
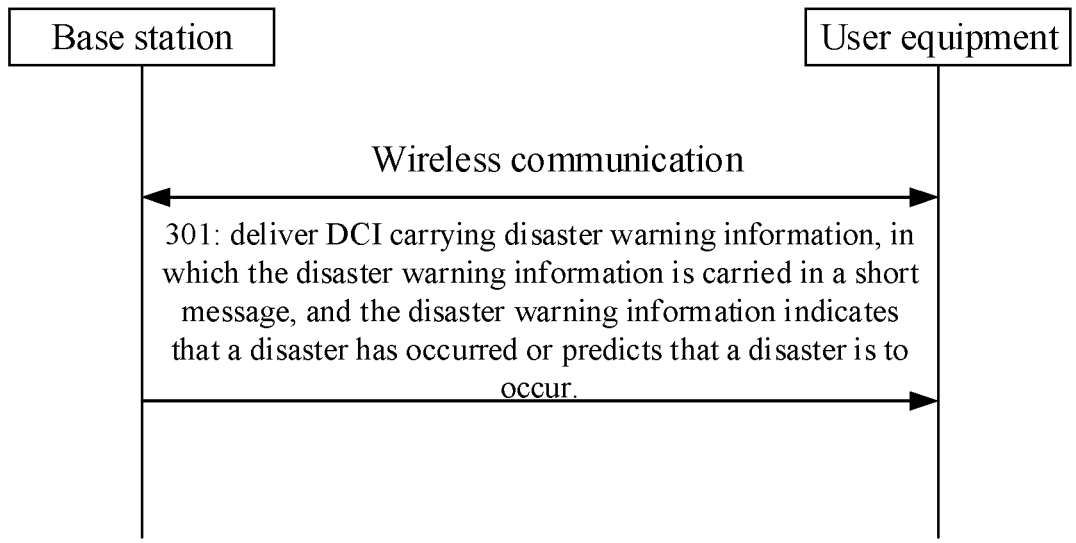
FIG. 3 is a flowchart of another information transmission method according to an embodiment.

Embodiments of the present disclosure provide an information transmission method that can be applied to a base station in a mobile communication network. As shown in FIG. 3, the information transmission method may include: in step 301, delivering DCI carrying disaster warning information, in which the disaster warning information is carried in a short message, and the disaster warning information indicates that a disaster has occurred or predicts that a disaster is to occur.

Here, the disaster warning information may be used to indicate the occurrence of disaster events to the UE, and the disaster events may include: earthquake, tsunami, and human-made disaster events as defined in ETWS and/or CMAS. The disaster warning information can be defined to indicate one or more disaster events, and the disaster warning information can also be defined to generally refer to all disaster events.

The disaster warning information may use one bit or a plurality of bits to indicate a disaster event.

In some examples, a warning event occupies one bit, and "0" can be used to indicate that no disaster event has occurred, and "1" can be used to indicate that a disaster event has occurred. It is also possible to use "1" to indicate that no disaster event has occurred, and "0" to indicate that a disaster event has occurred. The warning event may also occupy a plurality of bits, and a plurality of codes with different bits are used to represent different disaster events. For example, "01" can be used to indicate the occurrence of a disaster event, and "10" can also be used to indicate the occurrence of a disaster event.

In downlink communication, the base station first uses PDCCH resources to send DCI for scheduling transmission resources. The base station can use DCI to carry disaster warning information. The base station can use reserved bits in the DCI to carry the disaster warning information, or can use the reserved bits to encode the disaster warning information. Here, the DCI may be the DCI format 1_0 for downlink scheduling.

In some examples, one code of two bits is used in DCI to carry specific information, and other codes of the two bits are not defined. For example, "00" is used to carry the specific information, and "01", "10" and "11" are not defined. At this time, one or more of "01", "10" and "11" may be defined as disaster warning information.

During the data communication process, the UE can monitor the PDCCH resources. When the base station has the information to be sent to the UE, the PDCCH signaling can be sent in the PDCCH resource. The PDCCH signaling carries the DCI to indicate the PDSCH resource that carries the data information.

A short message may be carried in the DCI, and the short message may be used to indicate a change of the communication system information, and indicate the stop of monitoring the paging message. Here, the short messages can be used to carry disaster warning information. After receiving the DCI, the UE can obtain the short message indicator by parsing the DCI content, and then determine the warning information in the short message.

When the UE monitors the downlink communication of the base station, it firstly monitors the downlink DCI using PDCCH resources. Therefore, when the DCI carries disaster warning information, the UE can obtain the disaster warning information after parsing the DCI. After receiving the disaster warning information, the UE may alert the user by means of prompts such as images and/or sounds and/or vibrations. Here, the UE may be in a connected state, an idle state or an inactive state.

In this way, the base station uses the DCI to carry the disaster warning information, and the UE can directly obtain the disaster warning information from the DCI, which shortens the receiving process of obtaining the disaster warning information, reduces the receiving time, and improves the timeliness of the warning.

In an embodiment, the DCI further carries resource scheduling information for scheduling transmission resources.

Here, DCI can be used to schedule transmission resources. The transmission resources may include downlink transmission resources and the like. The UE may determine the transmission resource for data transmission according to the indication of the resource scheduling information. Disaster warning information can be carried by using the DCI that schedules the transmission resources. The amount of information carried by the DCI is increased, and the utilization efficiency of the DCI is improved.

In an embodiment, the transmission resources scheduled by the resource scheduling information are used to transmit paging messages.

When the UE is in an idle state or an inactive state, the UE monitors the DCI on the PDCCH resource for scheduling the transmission resource of the paging message.

The base station can carry disaster warning information in the DCI, and the UE can analyze the disaster warning information in the DCI at the first time when monitoring the PDCCH resources. Compared with determining the warning indication from the paging message and obtaining the disaster warning information from the SIB, the receiving process of the disaster warning information is shortened, the receiving time is reduced, and the timeliness of the warning is improved.

In an embodiment, the DCI is scrambled with a cyclic redundancy check (CRC) using a paging radio network temporary identifier P-RNTI.

Here, the DCI for carrying the disaster warning information may be the DCI for scheduling the transmission resources of the paging message, and the DCI may be the DCI format 1_0 of CRC scrambled by P-PNTI.

In an embodiment, a reserved bit of the short message of the DCI carry the disaster warning information.

The short message is set in the DCI of the P-PNTI scrambling CRC, and the short message occupies a plurality of bits.

In some examples, the short message occupies eight bits, in which the first bit to the third bit are used to indicate a change of the communication system information, and indicate the stop of monitoring the paging message.

Here, one or more of the fourth bit to the eighth bit may be used to indicate the disaster warning information.

In some examples, the disaster warning information may occupy two bits, and use different codes to indicate different disaster events, such as earthquake, tsunamis, and the like.

In an embodiment, the short message carries disaster prediction information associated with the disaster warning information, and the disaster prediction information indicates at least one of the following items: a type of a predicted disaster; a level of the predicted disaster; a geographic location of the predicted disaster; and time of the predicted disaster.

The short message can carry disaster prediction information by reserved bits or codes of the reserved bits.

The disaster warning information can be used directly to indicate that a disaster has occurred or predict a disaster. The disaster prediction information can provide detailed information on the predicted disaster. In some examples, the short message occupies eight bits, in which the first bit to the third bit are used to indicate the change of the communication system information and indicate the stop of monitoring the paging message.

In an embodiment, one or more of the fourth to eighth bits may be used to indicate the disaster warning information, and one or more of the remaining bits may indicate the disaster prediction information.

In another embodiment, as long as the fourth bit to the eighth bit of the DCI includes the disaster prediction information, the disaster warning information is implicitly indicated. Therefore, the disaster warning information is already included in the short message of the DCI, and there is no need to expressly indicate the disaster warning information according to the bits. The disaster prediction information can be indicated by a plurality of bits reserved in the short message, and the type and level of the disaster can be indicated by different codes.

In some examples, in the disaster prediction information, the indication information of the disaster type may occupy one or two bits, and different codes are used to indicate different disaster types, such as earthquake, tsunami and so on.

The disaster prediction information may also indicate a predicted occurrence time and/or a predicted geographic range of a disaster.

In some examples, the prediction information may also include detailed information such as the severity of the disaster. For example, the prediction information may include: typhoon level, earthquake level, and focal depth.

In some examples, when the base station sends disaster warning information, a short message may also be used to indicate a disaster warning prompt. The disaster is indicated by reserved two bits, and the type of disaster is indicated by different codes. The remaining multiple bits can also be used to indicate the predicted occurrence time and/or predicted geographic range of the disaster. In this way, more detailed disaster information can be provided.

In some examples, the disaster warning information may also include warning protection information, which is used to instruct the user how to protect, how to seek help, and the like. For example, for typhoons, disaster warning information can provide tips on how to protect, for example, reducing going out and closing doors and windows, and can provide directions on locations of nearby shelters or hospitals.

Figure 4:
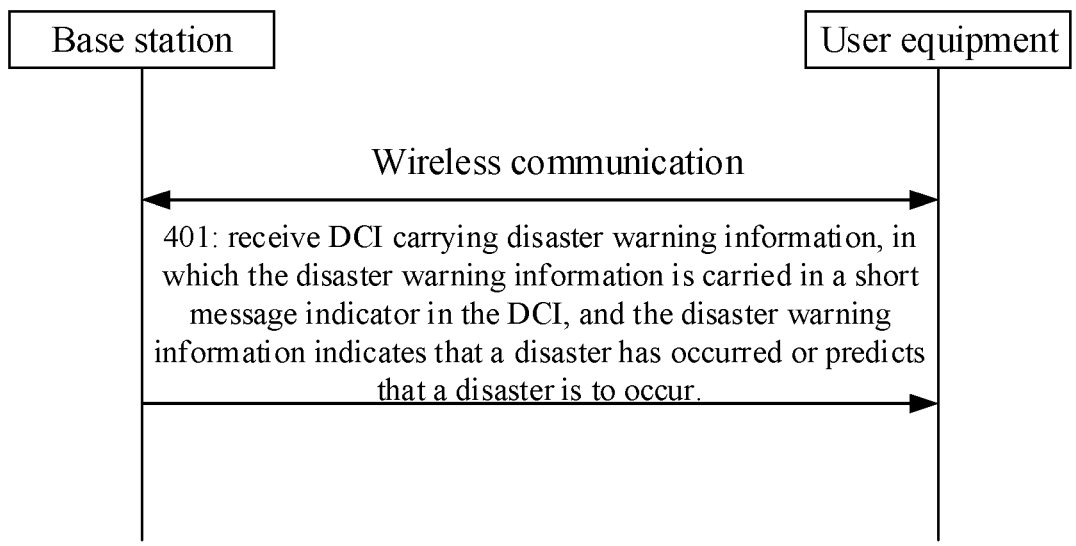
FIG. 4 is a flowchart of yet another information transmission method according to an embodiment.

Embodiments of the present disclosure provide an information transmission method that can be applied to UE in a mobile communication network. As shown in FIG. 4, the information transmission method may include: in step 401, receiving DCI carrying disaster warning information, in which the disaster warning information is carried in a short message indicator in the DCI, and the disaster warning information indicates that a disaster has occurred or predicts that a disaster is to occur.

Here, the disaster warning information may be used to indicate the occurrence of disaster events to the UE, and the disaster events may include: earthquake, tsunami, and human-made disaster events as defined in ETWS and/or CMAS. The disaster warning information can be defined to indicate one or more disaster events, and the disaster warning information can also be defined to generally refer to all disaster events.

The disaster warning information may use one bit or a plurality of bits to indicate a disaster event.

In some examples, a warning event occupies one bit, and "0" can be used to indicate that no disaster event has occurred, and "1" can be used to indicate that a disaster event has occurred. It is also possible to use "1" to indicate that no disaster event has occurred, and "0" to indicate that a disaster event has occurred. The warning event may also occupy a plurality of bits, and a plurality of codes with different bits are used to represent different disaster events. For example, "01" can be used to indicate the occurrence of a disaster event, and "10" can also be used to indicate the occurrence of a disaster event.

In downlink communication, the base station first uses PDCCH resources to send DCI for scheduling transmission resources. The base station can use DCI to carry disaster warning information. The base station can use reserved bits in the DCI to carry the disaster warning information, or can use the reserved bits to encode the disaster warning information. Here, the DCI may be the DCI format 1_0 for downlink scheduling.

In some examples, one code of two bits is used in DCI to carry specific information, and other codes of the two bits are not defined. For example, "00" is used to carry the specific information, and "01", "10" and "11" are not defined. At this time, one or more of "01", "10" and "11" may be defined as disaster warning information.

During the data communication process, the UE can monitor the PDCCH resources. When the base station has the information to be sent to the UE, the PDCCH signaling can be sent in the PDCCH resource. The PDCCH signaling carries the DCI to indicate the PDSCH resource that carries the data information.

The DCI may carry a short message indicator, and the short message indicator is used to indicate the configuration of the paging message and the short message carried by the DCI. Here, the short message indicator can be used to carry disaster warning information. After receiving the DCI, the UE can obtain the short message indicator by parsing the DCI content, and then determine the warning information in the short message indicator.

When the UE monitors the downlink communication of the base station, it firstly monitors the downlink DCI using PDCCH resources. Therefore, when the DCI carries disaster warning information, the UE can obtain the disaster warning information after parsing the DCI. After receiving the disaster warning information, the UE may alert the user by means of prompts such as images and/or sounds and/or vibrations. Here, the UE may be in a connected state, an idle state or an inactive state.

In this way, the base station uses the DCI to carry the disaster warning information, and the UE can directly obtain the disaster warning information from the DCI, which shortens the receiving process of obtaining the disaster warning information, reduces the receiving time, and improves the timeliness of the warning.

In an embodiment, the DCI further carries resource scheduling information for scheduling transmission resources.

Here, DCI can be used to schedule transmission resources. The transmission resources may include downlink transmission resources and the like. The UE may determine the transmission resource for data transmission according to the indication of the resource scheduling information. Disaster warning information can be carried by using the DCI that schedules the transmission resources. The amount of information carried by the DCI is increased, and the utilization efficiency of the DCI is improved.

In an embodiment, the transmission resources scheduled by the resource scheduling information are used to transmit paging messages.

When the UE is in an idle state or an inactive state, the UE monitors the DCI on the PDCCH resource for scheduling the transmission resource of the paging message.

The base station can carry disaster warning information in the DCI, and the UE can analyze the disaster warning information in the DCI at the first time when monitoring the PDCCH resources. Compared with determining the warning indication from the paging message and obtaining the disaster warning information from the SIB, the receiving process of the disaster warning information is shortened, the receiving time is reduced, and the timeliness of the warning is improved.

In an embodiment, the DCI is scrambled with a cyclic redundancy check (CRC) using a paging radio network temporary identifier P-RNTI.

Here, the DCI for carrying the disaster warning information may be the DCI for scheduling the transmission resources of the paging message, and the DCI may be the DCI format 1_0 of CRC scrambled by P-PNTI.

In an embodiment, a reserved code of the short message indicator of the DCI carries the disaster warning information.

The short message indicator is set in the DCI of the P-PNTI scrambling CRC. The short message indicator occupies two bits, and the short message indicator adopts different coding indications, paging messages and configurations of short messages carried by the DCI.

In some examples, as shown in Table 1, the short message indicator occupies two bits, and adopts different codes to indicate different contents. Here, "00" can be used to carry disaster warning information. When the UE parses that the short message indicator is "00", the disaster warning information is determined. Here "00" may indicate that a disaster event has occurred.

The UE can send warning information through the application layer, and the UE can send warnings by means of sound, image or vibration.

When the base station sends the disaster warning information, it can give priority to the disaster warning information in the short message indicator. That is, when the base station sends the disaster warning information, the code "00" is preferentially used for the short message indicator.

In an embodiment, the short message of the DCI carries disaster prediction information associated with the disaster warning information, and the disaster prediction information indicates at least one of the following items: a type of a predicted disaster; a level of the predicted disaster; a geographic location of the predicted disaster; and time of the predicted disaster.

The DCI may also carry a short message, and the short message may be used to carry the disaster prediction information.

The disaster warning information can be used directly to indicate that a disaster has occurred or predict a disaster. The disaster prediction information can provide detailed information on the predicted disaster.

In some examples, the short message occupies eight bits, in which the first bit to the third bit are used to indicate a change of the communication system information, and indicate the stop of monitoring the paging message.

Here, one or more of the fourth bit to the eighth bit may be used to indicate the disaster prediction information.

In some examples, the indication information of the disaster type may occupy one or two bits, and different codes are used to indicate different disaster types, such as earthquake, tsunami and so on.

In some examples, when the base station sends disaster warning information, a short message indicator may be used to indicate a disaster warning prompt. Disaster is indicated with the reserved code "00", but the type of disaster is not indicated. When the base station sends the disaster warning information, the short message can also be used to indicate the disaster prediction information. The disaster prediction information is indicated by a plurality of bits reserved in the short message, and the type and level of the disaster are indicated by different codes.

The disaster prediction information may also indicate a predicted occurrence time and/or a predicted geographic range of a disaster.

In some examples, the prediction information may also include detailed information such as the severity of the disaster. For example, the prediction information may include: typhoon level, earthquake level, and focal depth.

In some examples, when the base station sends disaster warning information, a short message may also be used to indicate a disaster warning prompt. The disaster is indicated by reserved two bits, and the type of disaster is indicated by different codes. The remaining multiple bits can also be used to indicate the predicted occurrence time and/or predicted geographic range of the disaster. In this way, more detailed disaster information can be provided.

In some examples, the disaster warning information may also include warning protection information, which is used to instruct the user how to protect, how to seek help, and the like. For example, for typhoons, disaster warning information can provide tips on how to protect, for example, reducing going out and closing doors and windows, and can provide directions on locations of nearby shelters or hospitals.

Figure 5:
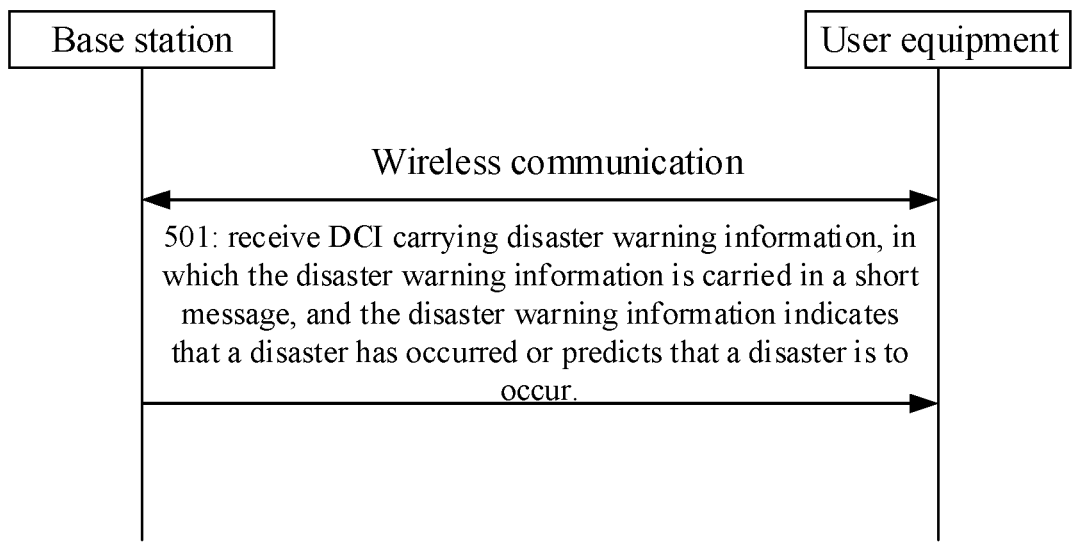
FIG. 5 is a flowchart of still another information transmission method according to an embodiment.

Embodiments of the present disclosure provide an information transmission method that can be applied to UE in a mobile communication network. As shown in FIG. 5, the information transmission method may include: in step 501, receiving DCI carrying disaster warning information, in which the disaster warning information is carried in a short message, and the disaster warning information indicates that a disaster has occurred or predicts that a disaster is to occur.

Here, the disaster warning information may be used to indicate the occurrence of disaster events to the UE, and the disaster events may include: earthquake, tsunami, and human-made disaster events as defined in ETWS and/or CMAS. The disaster warning information can be defined to indicate one or more disaster events, and the disaster warning information can also be defined to generally refer to all disaster events.

The disaster warning information may use one bit or a plurality of bits to indicate a disaster event.

In some examples, a warning event occupies one bit, and "0" can be used to indicate that no disaster event has occurred, and "1" can be used to indicate that a disaster event has occurred. It is also possible to use "1" to indicate that no disaster event has occurred, and "0" to indicate that a disaster event has occurred. The warning event may also occupy a plurality of bits, and a plurality of codes with different bits are used to represent different disaster events. For example, "01" can be used to indicate the occurrence of a disaster event, and "10" can also be used to indicate the occurrence of a disaster event.

In downlink communication, the base station first uses PDCCH resources to send DCI for scheduling transmission resources. The base station can use DCI to carry disaster warning information. The base station can use reserved bits in the DCI to carry the disaster warning information, or can use the reserved bits to encode the disaster warning information. Here, the DCI may be the DCI format 1_0 for downlink scheduling.

In some examples, one code of two bits is used in DCI to carry specific information, and other codes of the two bits are not defined. For example, "00" is used to carry the specific information, and "01", "10" and "11" are not defined. At this time, one or more of "01", "10" and "11" may be defined as disaster warning information.

During the data communication process, the UE can monitor the PDCCH resources. When the base station has the information to be sent to the UE, the PDCCH signaling can be sent in the PDCCH resource. The PDCCH signaling carries the DCI to indicate the PDSCH resource that carries the data information.

A short message may be carried in the DCI, and the short message may be used to indicate a change of the communication system information, and indicate the stop of monitoring the paging message. Here, the short messages can be used to carry disaster warning information. After receiving the DCI, the UE can obtain the short message indicator by parsing the DCI content, and then determine the warning information in the short message.

When the UE monitors the downlink communication of the base station, it firstly monitors the downlink DCI using PDCCH resources. Therefore, when the DCI carries disaster warning information, the UE can obtain the disaster warning information after parsing the DCI. After receiving the disaster warning information, the UE may alert the user by means of prompts such as images and/or sounds and/or vibrations. Here, the UE may be in a connected state, an idle state or an inactive state.

In this way, the base station uses the DCI to carry the disaster warning information, and the UE can directly obtain the disaster warning information from the DCI, which shortens the receiving process of obtaining the disaster warning information, reduces the receiving time, and improves the timeliness of the warning.

In an embodiment, the DCI further carries resource scheduling information for scheduling transmission resources.

Here, DCI can be used to schedule transmission resources. The transmission resources may include downlink transmission resources and the like. The UE may determine the transmission resource for data transmission according to the indication of the resource scheduling information. Disaster warning information can be carried by using the DCI that schedules the transmission resources. The amount of information carried by the DCI is increased, and the utilization efficiency of the DCI is improved.

In an embodiment, the transmission resources scheduled by the resource scheduling information are used to transmit paging messages.

When the UE is in an idle state or an inactive state, the UE monitors the DCI on the PDCCH resource for scheduling the transmission resource of the paging message.

The base station can carry disaster warning information in the DCI, and the UE can analyze the disaster warning information in the DCI at the first time when monitoring the PDCCH resources. Compared with determining the warning indication from the paging message and obtaining the disaster warning information from the SIB, the receiving process of the disaster warning information is shortened, the receiving time is reduced, and the timeliness of the warning is improved.

In an embodiment, the DCI is scrambled with a cyclic redundancy check (CRC) using a paging radio network temporary identifier P-RNTI.

Here, the DCI for carrying the disaster warning information may be the DCI for scheduling the transmission resources of the paging message, and the DCI may be the DCI format 1_0 of CRC scrambled by P-PNTI.

In an embodiment, a reserved bit of the short message of the DCI carry the disaster warning information.

The short message is set in the DCI of the P-PNTI scrambling CRC, and the short message occupies a plurality of bits.

In some examples, the short message occupies eight bits, in which the first bit to the third bit are used to indicate a change of the communication system information, and indicate the stop of monitoring the paging message.

Here, one or more of the fourth bit to the eighth bit may be used to indicate the disaster warning information.

In some examples, the disaster warning information may occupy two bits, and use different codes to indicate different disaster events, such as earthquake, tsunamis, and the like.

In an embodiment, the short message carries disaster prediction information associated with the disaster warning information, and the disaster prediction information indicates at least one of the following items: a type of a predicted disaster; a level of the predicted disaster; a geographic location of the predicted disaster; and time of the predicted disaster.

The short message can carry disaster prediction information by reserved bits or codes of the reserved bits.

The disaster warning information can be used directly to indicate that a disaster has occurred or predict a disaster. The disaster prediction information can provide detailed information on the predicted disaster. In some examples, the short message occupies eight bits, in which the first bit to the third bit are used to indicate the change of the communication system information and indicate the stop of monitoring the paging message.

In an embodiment, one or more of the fourth to eighth bits may be used to indicate the disaster warning information, and one or more of the remaining bits may indicate the disaster prediction information.

In another embodiment, as long as the fourth bit to the eighth bit of the DCI includes the disaster prediction information, the disaster warning information is implicitly indicated. Therefore, the disaster warning information is already included in the short message of the DCI, and there is no need to expressly indicate the disaster warning information according to the bits. The disaster prediction information can be indicated by a plurality of bits reserved in the short message, and the type and level of the disaster can be indicated by different codes.

In some examples, in the disaster prediction information, the indication information of the disaster type may occupy one or two bits, and different codes are used to indicate different disaster types, such as earthquake, tsunami and so on.

The disaster prediction information may also indicate a predicted occurrence time and/or a predicted geographic range of a disaster.

In some examples, the prediction information may also include detailed information such as the severity of the disaster. For example, the prediction information may include: typhoon level, earthquake level, and focal depth.

In some examples, when the base station sends disaster warning information, a short message may also be used to indicate a disaster warning prompt. The disaster is indicated by reserved two bits, and the type of disaster is indicated by different codes. The remaining multiple bits can also be used to indicate the predicted occurrence time and/or predicted geographic range of the disaster. In this way, more detailed disaster information can be provided.

In some examples, the disaster warning information may also include warning protection information, which is used to instruct the user how to protect, how to seek help, and the like. For example, for typhoons, disaster warning information can provide tips on how to protect, for example, reducing going out and closing doors and windows, and can provide directions on locations of nearby shelters or hospitals.

A specific example is provided below in conjunction with any of the above-mentioned embodiments.

The present disclosure provides a disaster warning method.

For the indication mode of short messages indicator, a new indication is added, and 00 is defined as indicating that ETWS or CMAS is about to occur, as shown in Table 1.

When the base station has disaster warning information to be sent, a short message indicator set to 00 can be sent to the UE through DCI format 1_0 scrambled by P-RNTI.

After receiving the instruction, the UE immediately notifies the application layer to give the user a disaster warning prompt.

Alternatively, without changing the indication mode of the existing short message indicator, interpretation of the reserved bit is added to the short message, and a single bit or a combination of bits can be used for the interpretation in order to convey more information. For example, the fourth bit in the short message is defined as a disaster information indication bit, and if it is set to 1, it means that a disaster is about to happen.

When the base station has disaster warning information to be sent, a short message indicator set to 10 can be sent to the UE through DCI format 1_0 scrambled by P-RNTI.

After receiving the instruction, the UE immediately reads the short message, and if the fourth bit is 1, the UE notifies the application layer to give the user a disaster warning prompt.

Figure 6:
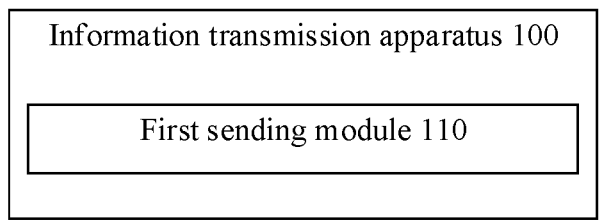
FIG. 6 is a block diagram of an information transmission apparatus such as a base station according to an embodiment.

Embodiments of the present disclosure further provides an information transmission apparatus, which is applied to a base station. FIG. 6 is a schematic structural view of an information transmission apparatus 100 according to the embodiments of the present disclosure. As shown in FIG. 6, the information transmission apparatus 100 includes: a first sending module 110 configured to deliver DCI carrying disaster warning information, in which the disaster warning information is carried in a short message indicator in the DCI, and the disaster warning information indicates that a disaster has occurred or predicts that a disaster is to occur.

In an embodiment, a reserved code of the short message indicator of the DCI carries the disaster warning information.

In an embodiment, the short message indicator of the DCI carries disaster prediction information associated with the disaster warning information, and the disaster prediction information indicates at least one of the following items: a type of a predicted disaster; a level of the predicted disaster; a geographic location of the predicted disaster; and time of the predicted disaster.

Figure 7:
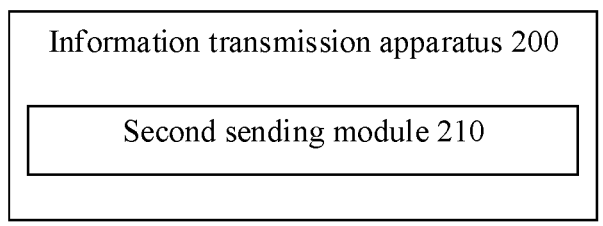
FIG. 7 is a block diagram of another information transmission apparatus such as a base station according to an embodiment.

Embodiments of the present disclosure further provides an information transmission apparatus, which is applied to a base station. FIG. 7 is a schematic structural view of an information transmission apparatus 200 according to the embodiments of the present disclosure. As shown in FIG. 7, the information transmission apparatus 200 includes: a second sending module 210 configured to deliver DCI carrying disaster warning information, in which the disaster warning information is carried in a short message, and the disaster warning information indicates that a disaster has occurred or predicts that a disaster is to occur.

In an embodiment, a reserved bit of the short message of the DCI carries the disaster warning information.

In an embodiment, the short message carries disaster prediction information associated with the disaster warning information, and the disaster prediction information indicates at least one of the following items: a type of a predicted disaster; a level of the predicted disaster; a geographic location of the predicted disaster; and time of the predicted disaster.

Figure 8:
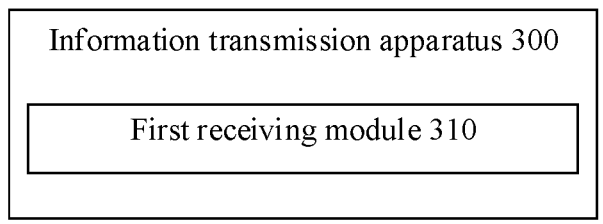
FIG. 8 is a block diagram of yet another information transmission apparatus such as a user equipment (UE) according to an embodiment.

Embodiments of the present disclosure further provides an information transmission apparatus, which is applied to UE. FIG. 8 is a schematic structural view of an information transmission apparatus 300 according to the embodiments of the present disclosure. As shown in FIG. 8, the information transmission apparatus 300 includes: a first receiving module 310 configured to receive DCI carrying disaster warning information, in which the disaster warning information is carried in a short message indicator in the DCI, and the disaster warning information indicates that a disaster has occurred or predicts that a disaster is to occur.

In an embodiment, a reserved code of the short message indicator of the DCI carries the disaster warning information.

In an embodiment, the short message indicator of the DCI carries disaster prediction information associated with the disaster warning information, and the disaster prediction information indicates at least one of the following items: a type of a predicted disaster; a level of the predicted disaster; a geographic location of the predicted disaster; and time of the predicted disaster.

Figure 9:
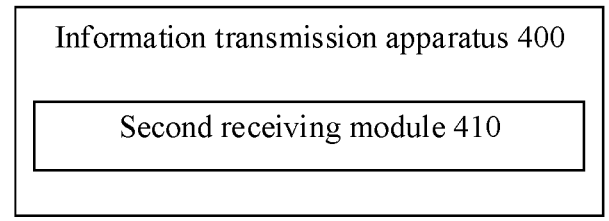
FIG. 9 is a block diagram of still another information transmission apparatus such as a user equipment (UE) according to an embodiment.

Embodiments of the present disclosure further provides an information transmission apparatus, which is applied to UE. FIG. 9 is a schematic structural view of an information transmission apparatus 400 according to the embodiments of the present disclosure. As shown in FIG. 9, the information transmission apparatus 400 includes: a second receiving module 410 configured to receive DCI carrying disaster warning information, in which the disaster warning information is carried in a short message, and the disaster warning information indicates that a disaster has occurred or predicts that a disaster is to occur.

In an embodiment, a reserved bit of the short message of the DCI carries the disaster warning information.

In an embodiment, the short message carries disaster prediction information associated with the disaster warning information, and the disaster prediction information indicates at least one of the following items: a type of a predicted disaster; a level of the predicted disaster; a geographic location of the predicted disaster; and time of the predicted disaster.

In an embodiment, the first sending module 110, the second sending module 210, the first receiving module 310, the second receiving module 320 may be implemented by one or more central processing units (CPU), graphics processing units (GPU), baseband processors (BP), application specific integrated circuits (ASIC), DSP, programmable logic devices (PLD), complex programmable logic devices (CPLD), field programmable gate arrays (FPGA), general-purpose processors, controllers, microcontroller units (MCU), microprocessors, or other electronic components, and can also be implemented in combination with one or more radio frequency (RF) antennas to perform the aforementioned methods.

Figure 10:
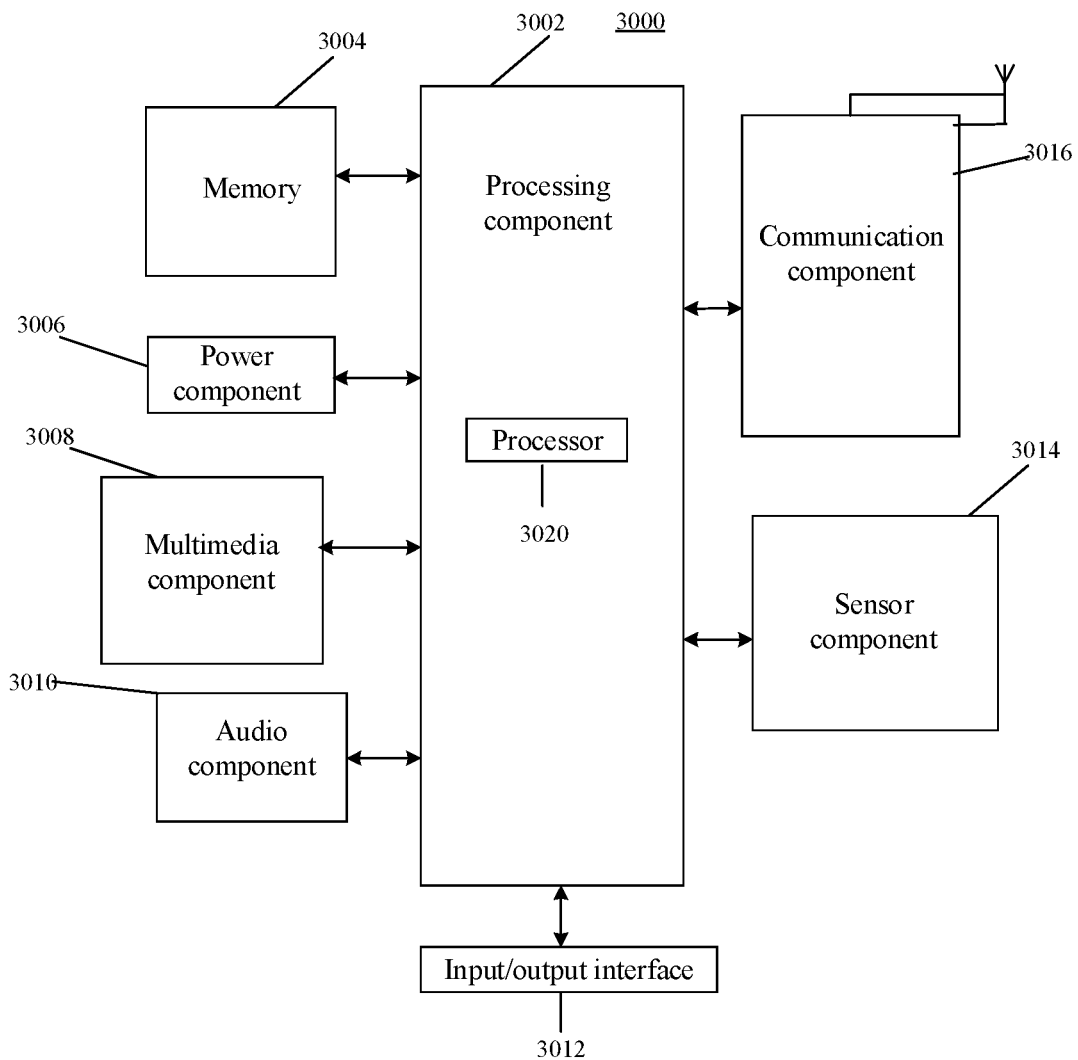
FIG. 10 is a block diagram of a device for information transmission according to an embodiment.

FIG. 10 is a block diagram of a device 3000 for information transmission according to an embodiment. For example, the device 3000 may be a mobile phone, a computer, a digital broadcast terminal, a messaging device, a gaming console, a tablet, a medical device, exercise equipment, a personal digital assistant and the like.

Referring to FIG. 10, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 820 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or a combination thereof. In an embodiment, the communication component 3016 receives a broadcast signal or broadcast associated information from an external broadcast management system via a broadcast channel. In an embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is also provided a non-transitory computer-readable storage medium including instructions, such as included in the memory 3004, executable by the processor 820 in the device 3000, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

The invention claimed is:

1. An information transmission method, applied to a base station, and comprising:
    delivering downlink control information carrying disaster warning information,
    wherein the disaster warning information is carried in a short message indicator in the downlink control information or carried in a short message, and the disaster warning information indicates that a disaster has occurred or predicts that a disaster is to occur,
    wherein the short message carries disaster prediction information associated with the disaster warning information, and the disaster prediction information indicates at least one of the following items: a type of a predicted disaster, a level of the predicted disaster, a geographic location of the predicted disaster, and time of the predicted disaster; and
    the short message occupies eight bits, wherein the first bit to the third bit are used to indicate a change of communication system information, and indicate a stop of monitoring a paging message, and one or more of the fourth bit to the eighth bit are used to indicate the disaster prediction information.

2. The information transmission method according to claim 1, wherein a reserved code of the short message indicator of the downlink control information carries the disaster warning information.

3. The information transmission method according to claim 1, wherein the short message indicator of the downlink control information carries disaster prediction information associated with the disaster warning information, and the disaster prediction information indicates at least one of the following items:
    a type of a predicted disaster; a level of the predicted disaster;
    a geographic location of the predicted disaster; and
    time of the predicted disaster.

4. The information transmission method according to claim 1, wherein a reserved bit of the short message of the downlink control information carries the disaster warning information.

5. An information transmission method, applied to user equipment and comprising:
    receiving downlink control information carrying disaster warning information,
    wherein the disaster warning information is carried in a short message indicator in the downlink control information or carried in a short message, and the disaster warning information indicates that a disaster has occurred or predicts that a disaster is to occur,
    wherein the short message carries disaster prediction information associated with the disaster warning information, and the disaster prediction information indicates at least one of the following items: a type of a predicted disaster, a level of the predicted disaster, a geographic location of the predicted disaster, and time of the predicted disaster; and
    the short message occupies eight bits, wherein the first bit to the third bit are used to indicate a change of communication system information, and indicate a stop of monitoring a paging message, and one or more of the fourth bit to the eighth bit are used to indicate the disaster prediction information.

6. The information transmission method according to claim 5, wherein a reserved code of the short message indicator of the downlink control information carries the disaster warning information.

7. The information transmission method according to claim 5, wherein the short message indicator of the downlink control information carries disaster prediction information associated with the disaster warning information, and the disaster prediction information indicates at least one of the following items:
- a type of a predicted disaster;
- a level of the predicted disaster;
- a geographic location of the predicted disaster; and
- time of the predicted disaster.

8. The information transmission method according to claim 5,
wherein a reserved bit of the short message of the downlink control information carries the disaster warning information.

9. A communication device, comprising:
a processor; and
a memory coupled to the processor,
wherein an executable program for information transmission is stored in the memory, and the processor implements the information transmission method according to claim 1 when the executable program is executed.

10. A non-transitory storage medium, wherein an executable program for information transmission is stored in the storage medium, and a processor implements the information transmission method according to claim 1 when the executable program is executed by the processor.

11. A communication device, comprising:
a processor; and
a memory coupled to the processor,
wherein an executable program for information transmission is stored in the memory, and the processor implements an information transmission method when the executable program is executed,
wherein the information transmission method is applied to user equipment and comprises: receiving downlink control information carrying disaster warning information, wherein the disaster warning information is carried in a short message indicator in the downlink control information or carried in a short message, and the disaster warning information indicates that a disaster has occurred or predicts that a disaster is to occur,
wherein the short message carries disaster prediction information associated with the disaster warning information, and the disaster prediction information indicates at least one of the following items: a type of a predicted disaster, a level of the predicted disaster, a geographic location of the predicted disaster, and time of the predicted disaster; and
the short message occupies eight bits, wherein the first bit to the third bit are used to indicate a change of communication system information, and indicate a stop of monitoring a paging message, and one or more of the fourth bit to the eighth bit are used to indicate the disaster prediction information.

12. The communication device according to claim 11, wherein a reserved code of the short message indicator of the downlink control information carries the disaster warning information.

13. The communication device according to claim 11, wherein the short message indicator of the downlink control information carries disaster prediction information associated with the disaster warning information, and the disaster prediction information indicates at least one of the following items:
- a type of a predicted disaster;
- a level of the predicted disaster;
- a geographic location of the predicted disaster; and
- time of the predicted disaster.

14. The communication device according to claim 11, wherein a reserved bit of the short message of the downlink control information carries the disaster warning information.

15. A non-transitory storage medium, wherein an executable program for information transmission is stored in the storage medium, and a processor implements the information transmission method according to claim 5 when the executable program is executed by the processor.

16. The non-transitory storage medium according to claim 15, wherein a reserved code of the short message indicator of the downlink control information carries the disaster warning information.

17. The non-transitory storage medium according to claim 15, wherein a reserved bit of the short message of the downlink control information carries the disaster warning information.

* * * * *